(12) United States Patent
Williamson

(10) Patent No.: US 11,691,466 B1
(45) Date of Patent: Jul. 4, 2023

(54) VERTICAL TAPERED TRAILER HITCH COUPLING

(71) Applicant: Darwin Williamson, Amegard, ND (US)

(72) Inventor: Darwin Williamson, Amegard, ND (US)

( * ) Notice: Subject to any disclaimer, the term of this patent is extended or adjusted under 35 U.S.C. 154(b) by 109 days.

(21) Appl. No.: 17/148,259

(22) Filed: Jan. 13, 2021

(51) Int. Cl.
*B60D 1/06* (2006.01)
*B60D 1/07* (2006.01)
*B60D 1/167* (2006.01)

(52) U.S. Cl.
CPC ............ *B60D 1/167* (2013.01); *B60D 1/06* (2013.01); *B60D 1/07* (2013.01)

(58) Field of Classification Search
CPC ....................................................... B60D 1/07
USPC ....................................................... 280/511
See application file for complete search history.

(56) References Cited

U.S. PATENT DOCUMENTS

| | | | | |
|---|---|---|---|---|
| 4,620,736 A | * | 11/1986 | Shanks | B60R 19/48 |
| | | | | D12/162 |
| 4,627,633 A | * | 12/1986 | Gehman | B60D 1/06 |
| | | | | 280/507 |
| 4,662,647 A | * | 5/1987 | Calvert | B60D 1/46 |
| | | | | 280/491.5 |
| 6,979,015 B1 | * | 12/2005 | Eberle | B60D 1/06 |
| | | | | 280/461.1 |
| 10,406,871 B1 | * | 9/2019 | Cassidy | B60D 1/06 |
| 2006/0103111 A1 | * | 5/2006 | Popham | B60D 1/40 |
| | | | | 280/478.1 |

FOREIGN PATENT DOCUMENTS

| | | | |
|---|---|---|---|
| DE | 3842609 A1 | * 12/1988 | |
| DE | 10163559 A1 | * 8/2003 | ............... B60D 1/06 |

* cited by examiner

*Primary Examiner* — Minnah L Seoh
*Assistant Examiner* — Hosam Shabara
(74) *Attorney, Agent, or Firm* — Edwin H. Crabtree; Ramon L. Pizarro

(57) ABSTRACT

A vertical tapered trailer hitch coupling adapted for mounting on a vehicle hitch mounting frame. The mounting frame attached to an undercarriage at a rear of a vehicle. The vertical tapered trailer hitch coupling includes a vertical tapered collar with a four, equal sided tapered collar hole. A vertical, four equal sided tapered post is received inside the tapered collar hole. The post can be rotated 90 degrees in the collar hole. Mounted on top of tapered post is a trailer ball plate with a trailer ball. Also, the ball plate can include more than one trailer balls. This design allows for two different heights of drop hitches on a single hitch. The trailer balls are adapted for pulling different types of trailers behind the vehicle.

16 Claims, 3 Drawing Sheets

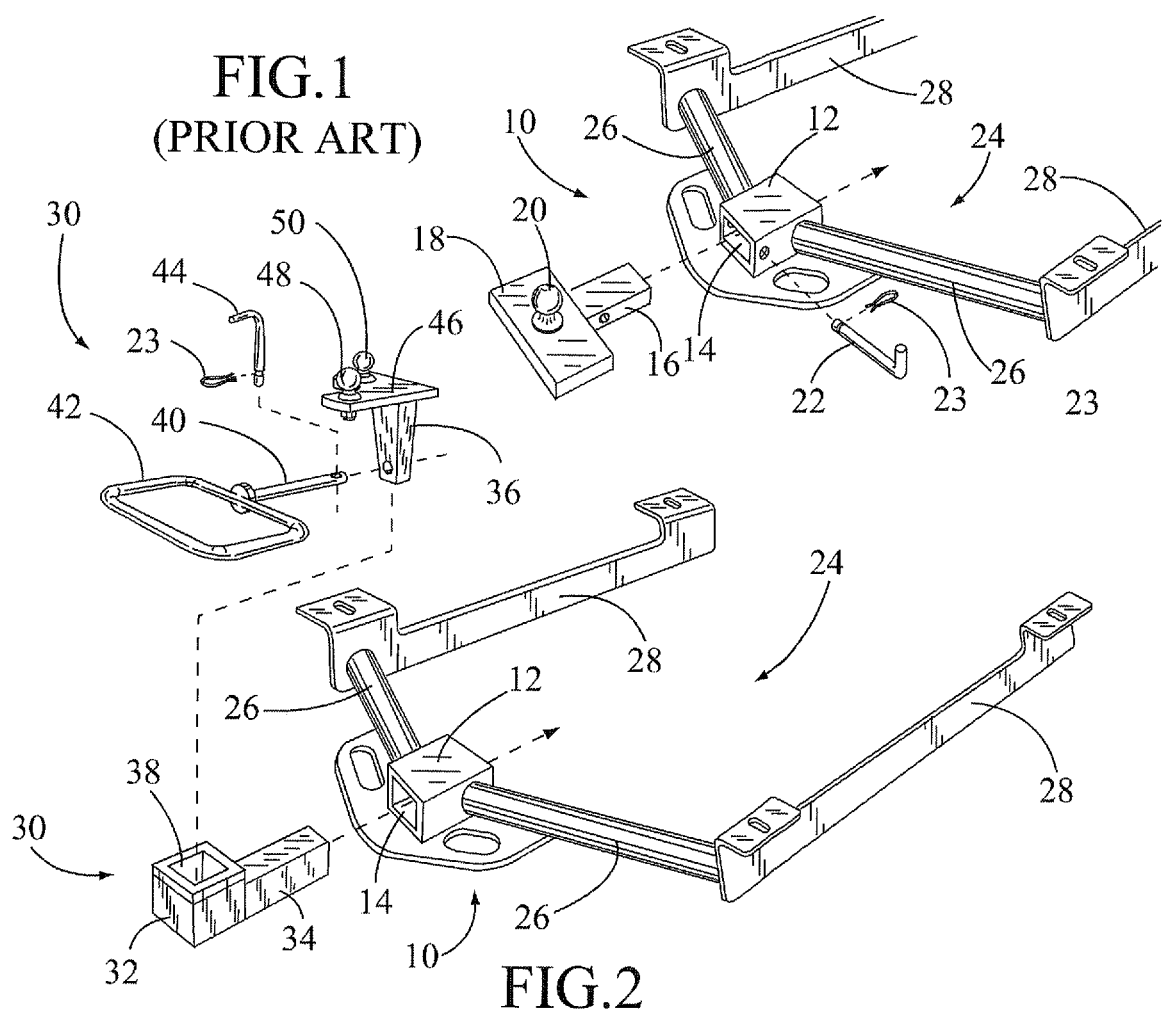
FIG.1 (PRIOR ART)
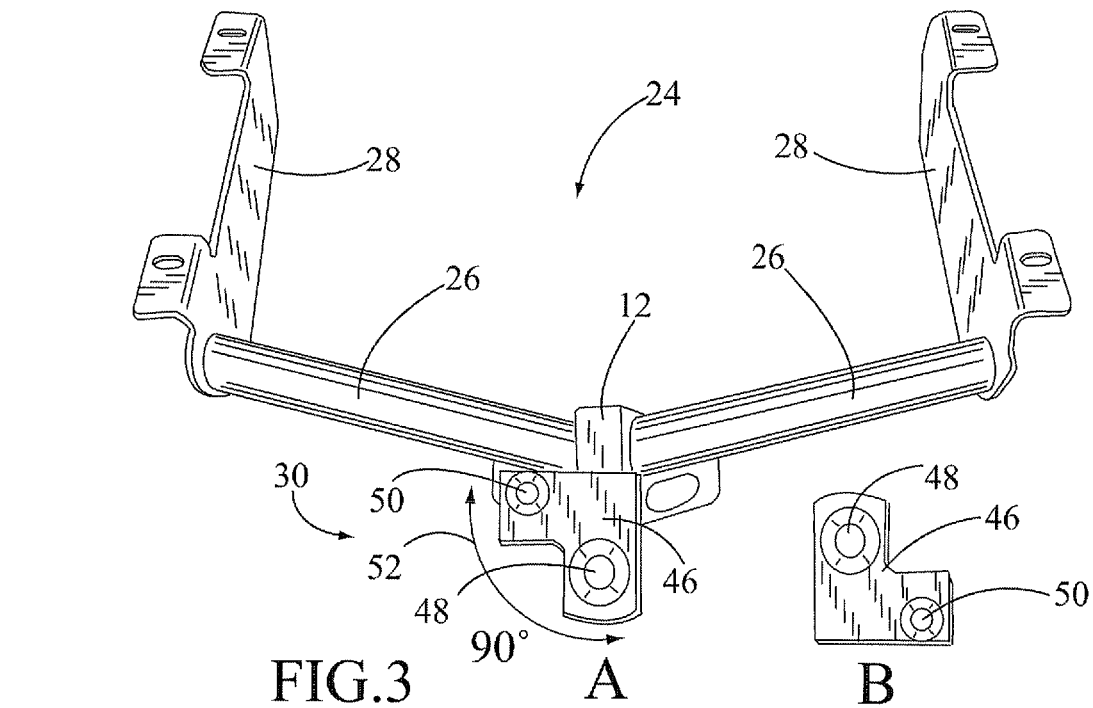
FIG.2
FIG.3

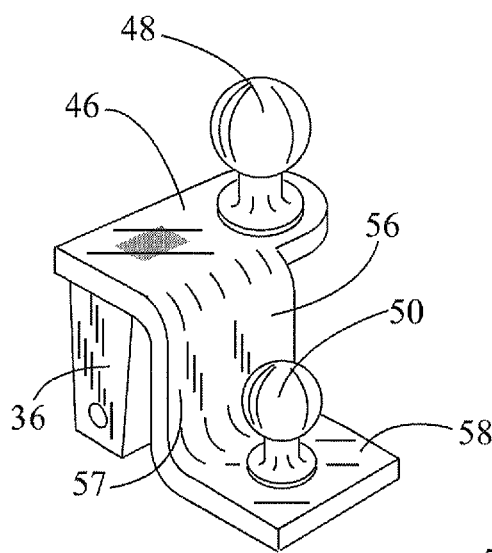
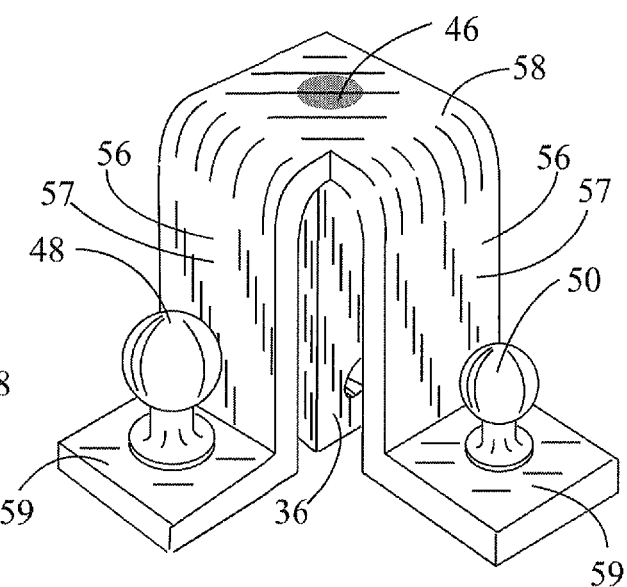
FIG. 5     FIG. 6
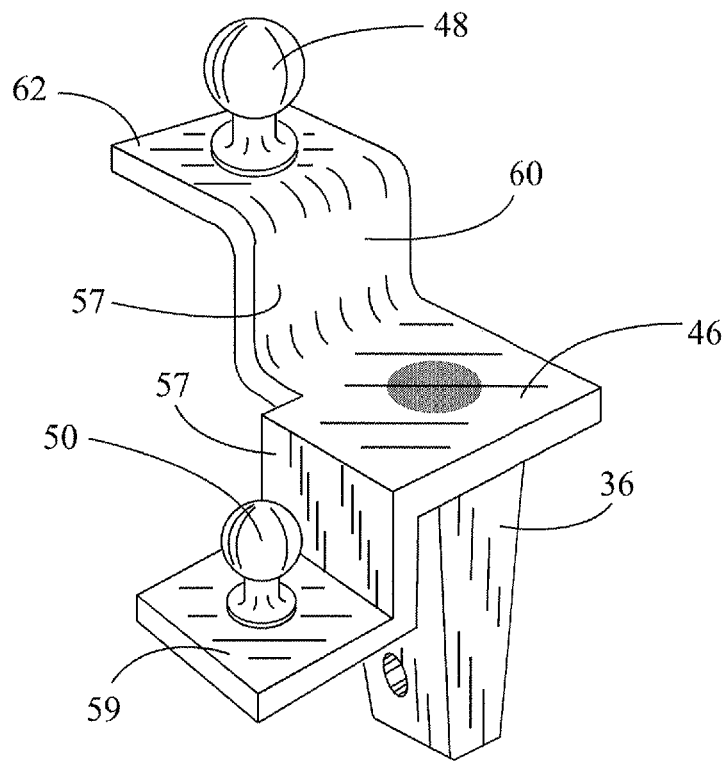
FIG. 7

VERTICAL TAPERED TRAILER HITCH COUPLING

BACKGROUND OF THE INVENTION (a) Field of the Invention

This invention relates to a vehicle trailer hitch, and more particularly, but not by way of limitation, to vertical tapered trailer hitch coupling for attaching to a mounting frame on a vehicle or attaching to an existing horizontal trailer hitch coupling mounted on the vehicle.

(b) Discussion of Prior Art

Heretofore, a typically vehicle trailer hitch includes a mounting frame attached to an undercarriage at the rear of a vehicle. The trailer hitch includes a horizontal trailer hitch coupling. The horizontal trailer hitch coupling includes a horizontal collar with horizontal collar hole. A horizontal post is inserted into the horizontal collar hole and pined thereto. At one end of the horizontal post is attached a trailer ball mounting plate with a trailer ball mounted on top of the mounting plate. The trailer ball is used for attachment to a trailer.

The subject invention provides unique advantages, objects and features over the above mentioned horizontal trailer hitch coupling as described herein.

SUMMARY OF THE INVENTION

In view of the foregoing, it is a primary objective of the subject invention to provide a vertical tapered trailer hitch coupling that eliminates coupling looseness, when compared to a standard horizontal trailer hitch coupling.

Another object of the invention is the vertical tapered trailer hitch coupling eliminates wear and noise when compared to the horizontal trailer hitch coupling.

Still another object of the invention is the subject hitch coupling can quickly retrofit a horizontal trailer hitch coupling to a vertical tapered trailer hitch coupling.

The subject invention includes a vertical tapered trailer hitch coupling adapted for mounting on a vehicle hitch mounting frame attached to an undercarriage at the rear of a vehicle. The vertical tapered trailer hitch coupling includes a vertical collar with a four, equal sided tapered collar hole. A vertical, four equal sided tapered post is received inside the tapered collar hole and can be rotated 90 degrees in the collar hole. Mounted on top of tapered post is a trailer ball plate with trailer ball. Also, the ball plate can include more than one trailer balls. The vertical tapered trailer hitch coupling also allows for various designs of drop hitches on the ball plate for customer needs for individual trailer heights. The trailer balls are adapted for pulling different types of trailers behind the vehicle.

These and other objects of the present invention will become apparent to those familiar with different types of trailer hitches when reviewing the following detailed description, showing novel construction, combination, and elements as herein described, and more particularly defined by the claims, it being understood that changes in the embodiments of the invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes devised for a practical application of the subject vertical tapered trailer hitch coupling, and in which:

FIG. 1 is an exploded perspective view of a prior art horizontal trailer hitch coupling positioned for attachment to a standard vehicle mounting frame.

FIG. 2 is an exploded perspective view of the subject vertical tapered trailer hitch coupling positioned for attachment to a standard vehicle mounting frame.

FIG. 3 is top perspective view of the vertical tapered trailer hitch coupling attached to the vehicle mounting frame.

FIGS. 5-7 illustrate different embodiments of a trailer ball plate adapted for different heights of trailers.

DETAILED DESCRIPTION OF THE PREFERRED EMBODIMENTS

Figures 4, 4A:
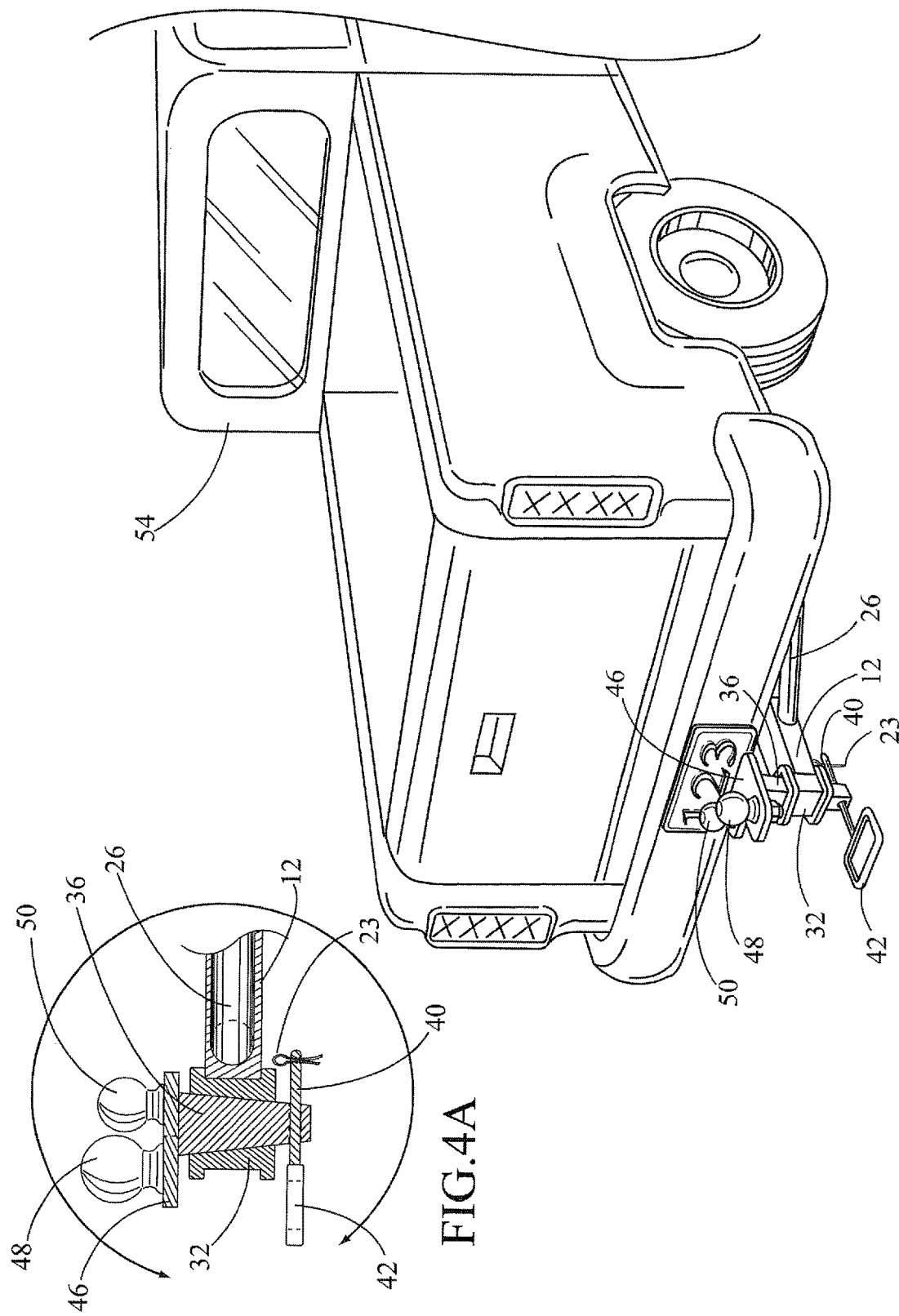
FIG. 4 is a rear perspective view of the vertical tapered trailer hitch coupling mounted on a rear of a vehicle.
FIG. 4A is a cross sectional view of the vertical tapered trailer hitch coupling illustrating the tapered post seated inside the tapered collar hole of the vertical collar.

In FIG. 1, an exploded perspective view of a prior art horizontal trailer hitch coupling is shown and having general reference numeral 10. The coupling 10 includes a horizontal collar 12 with horizontal collar hole 14. A horizontal post 16 is shown positioned for inserting into the collar hole 14. The horizontal post 16 includes a trailer ball plate 18 for mounting a trailer ball 20 thereon. An end to the post 16 is secured to horizontal collar 12 using a threaded pin 22. The horizontal collar 12 is attached to a standard vehicle mounting frame, having general reference numeral 24, used for mounting to an undercarriage of a vehicle. The mounting frame includes horizontal arms 26, which are attached to parallel mounting ribs 28.

It should be noted, the horizontal post 16 is subject to moving laterally inside the collar 12, thus providing a loose trailer hitch fit, excessive noise, and excessive wear during the operation of the horizontal trailer hitch coupling 10.

In FIG. 2, an exploded perspective view of the subject vertical tapered trailer hitch coupling is shown having general reference numeral 30. The vertical tapered trailer hitch coupling 30 is positioned for attachment to the standard vehicle mounting frame 24.

In this drawing, the vertical tapered trailer hitch coupling 30 retrofits the horizontal trailer hitch coupling 10 using a vertical collar 32 with another horizontal post 34 inserted into the horizontal collar hole 14 and secured thereto. The vertical tapered trailer hitch coupling 30 also includes a four equal sided, vertical tapered post 36 which is inserted into a vertical tapered collar hole 38, with four equal sides, and secured in the collar hole using a pin 40 with handle 42. The pin 40 is held in place using a second pin 44. An "L" shaped trailer ball plate 46 is mounted on top of the vertical tapered post 36. In this embodiment, the ball plate 46 includes a large trailer ball 48 and a smaller trailer ball 50, used for pulling different size trailers.

While it was mentioned above the vertical tapered hitch coupling 30 can be used for retrofitting the horizontal coupling 10, the horizontal collar 12 can be removed from the mounting frame 24 and the vertical tapered collar 32 attached directly to the frame. In this example, retrofitting is not necessary.

In FIG. 3, a top perspective view of the vertical tapered trailer hitch coupling 30 is shown attached to the vehicle mounting frame 24. In this view, an arrow 52 indicates the "L" shaped trailer ball plate 46, attached to the vertical tapered post 36, can be rotated 90 degrees, marked "A", in the vertical tapered collar hole 38. When the ball plate 46 is rotated 90 degrees, marked "B", the small trailer ball 50 can be used for pulling a trailer.

In FIG. 4, a rear perspective view of the vertical tapered trailer hitch coupling 30 is shown and mounted on the rear of a vehicle 54. In this drawing, the larger trailer ball 48 is positioned for pulling a trailer.

In FIG. 4A, a cross sectional view of the vertical tapered trailer hitch coupling 30 is shown illustrating the tapered vertical post 36 seated inside the tapered vertical collar hole 38 in the vertical tapered collar 32, and held therein in a press fit.

In FIG. 5, a perspective view of the trailer ball plate 46 is shown. The ball plate 46 has been formed into a drop trailer ball plate 56 with a vertical arm 57 bent downwardly next to a side of the vertical tapered post 36. A lower portion 59 of the arm 57 is bent outwardly and horizontally for holding the trailer ball 50 and engaging a trailer at a lower height.

In FIG. 6, another perspective view of the trailer ball plate 46 is shown. In this example, the ball plate 46 has been formed into a double drop trailer ball plate 58 with two vertical arms 57 bent downwardly next to the sides of the vertical tapered post 36. A lower portion 59 of the two arms 57 is bent outwardly and horizontally for holding different size balls 48 and 50.

In FIG. 7 a perspective view of the trailer ball plate 46 is shown. In this example, the ball plate 46 has been formed into a rise and drop combination trailer ball plate 60 with two vertical arms 57. One vertical arm 57 is bent downwardly next to a side of the vertical tapered post 36. The other vertical arm 57 is bent upwardly. The combination trailer ball plate 60 holds the trailer balls 48 and 50, on the lower portion 59 and an upper portion 62, at different heights for different heights of trailers.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A vertical tapered trailer hitch coupling adapted for mounting on a vehicle hitch mounting frame, the mounting frame attached to an undercarriage at a rear of a vehicle, the vertical tapered trailer hitch coupling comprising:
   a vertical tapered collar with a tapered collar hole, the collar hole tapered continuously from top to bottom and along a length thereof, the tapered collar hole having four equal sides;
   a tapered vertical post received inside the tapered collar hole, the vertical post tapered continuously from top to bottom and along a length thereof, the tapered vertical cost having four equal sides;
   a trailer ball plate mounted on top of the tapered vertical post; and
   a first trailer ball attached to the trailer ball plate, the first trailer ball adapted for pulling a trailer.

2. The vertical tapered trailer hitch coupling as described in claim 1 wherein the trailer ball plate includes a second trailer ball, the second trailer ball adapted for pulling different types of trailers behind the vehicle.

3. The vertical tapered trailer hitch as described in claim 2 wherein an arm of the trailer ball plate is bent downwardly and outwardly for holding the first trailer ball at a different height than the second trailer ball.

4. A vertical tapered trailer hitch coupling adapted for mounting on a vehicle hitch mounting frame, the mounting frame attached to an undercarriage at a rear of a vehicle, the vertical tapered trailer hitch coupling comprising:
   a vertical tapered collar with a four sided tapered collar hole, the collar hole tapered continuously from top to bottom and along a length of the four sides;
   a four sided tapered vertical post received inside the tapered collar hole, the vertical post tapered continuously from top to bottom and along a length of the four sides of the vertical post;
   a trailer ball plate mounted on top of the tapered vertical post;
   a first trailer ball attached to the trailer ball plate, the first trailer ball adapted for pulling a trailer; and
   a four sided horizontal post attached to the vertical tapered collar, the horizontal post adapted for and used for retrofitting a horizontal trailer hitch coupling to the vertical taper trailer hitch coupling.

5. The vertical tapered trailer hitch coupling as described in claim 4 wherein the tapered collar hole includes four equal tapered sides.

6. he vertical tapered trailer hitch coupling as described in claim 5 wherein the tapered vertical post includes four equal tapered sides for engaging the four equal tapered sides of the collar hole.

7. The vertical tapered trailer hitch coupling as described in claim 6 wherein the tapered vertical post can be rotated 90 degrees in the tapered collar hole.

8. The vertical tapered trailer hitch coupling as described in claim 4 wherein the trailer ball plate includes the first trailer ball and a second trailer ball, the first and second trailer balls adapted for pulling different types of trailers behind the vehicle.

9. The vertical tapered trailer hitch as described in claim 8 wherein an arm of the trailer ball plate is bent downwardly and outwardly for holding the first trailer ball at a different height than second trailer ball.

10. A vertical tapered trailer hitch coupling adapted for retrofitting in a horizontal collar, the horizontal collar mounted on a vehicle hitch mounting frame, the mounting frame attached to an undercarriage at a rear of a vehicle, the vertical tapered trailer hitch coupling comprising:
    a vertical tapered collar with a tapered collar hole, the collar hole tapered continuously from top to bottom and along a length thereof;
    an outwardly extending four sided horizontal post attached to the tapered collar, the horizontal post adapted for receipt in the horizontal collar:
    a tapered vertical post received inside the tapered collar hole, the vertical post tapered continuously from top to bottom and along a vertical length thereof;
    a trailer ball plate mounted on top of the tapered vertical post; and
    a first trailer ball attached to the trailer ball plate, the first trailer ball adapted for pulling a trailer, wherein the tapered collar hole includes four equal sides.

11. The vertical tapered trailer hitch coupling as described in claim 10 wherein the tapered vertical post includes four equal sides for engaging the four equal sides of the collar hole.

12. The vertical tapered trailer hitch coupling as described in claim 11 wherein the tapered vertical post can be rotated 90 degrees in the collar hole.

13. The vertical tapered trailer hitch coupling as described in claim 10 wherein the trailer ball plate includes the first trailer ball and a second trailer ball, the first and second trailer balls adapted for pulling different types of trailers behind the vehicle.

14. The vertical tapered trailer hitch as described in claim 13 wherein an arm of the trailer ball plate is bent downwardly and outwardly for holding the first trailer ball at a different height than the second trailer ball.

15. The vertical tapered trailer hitch as described in claim 13 wherein the trailer ball plate includes two arms bent downwardly and outwardly, one arm holding the first trailer ball and the other arm holding the second trailer ball.

16. The vertical tapered trailer hitch as described in claim 13 wherein the trailer ball plate includes two arms, one of the arms bent downwardly and outwardly, the other arm bent upwardly and outwardly, one of the arms holding the first trailer ball and the other arm holding the second trailer ball, the first and second trailer balls held at different heights for trailers of different heights.

\* \* \* \* \*